Figures 1, 2:
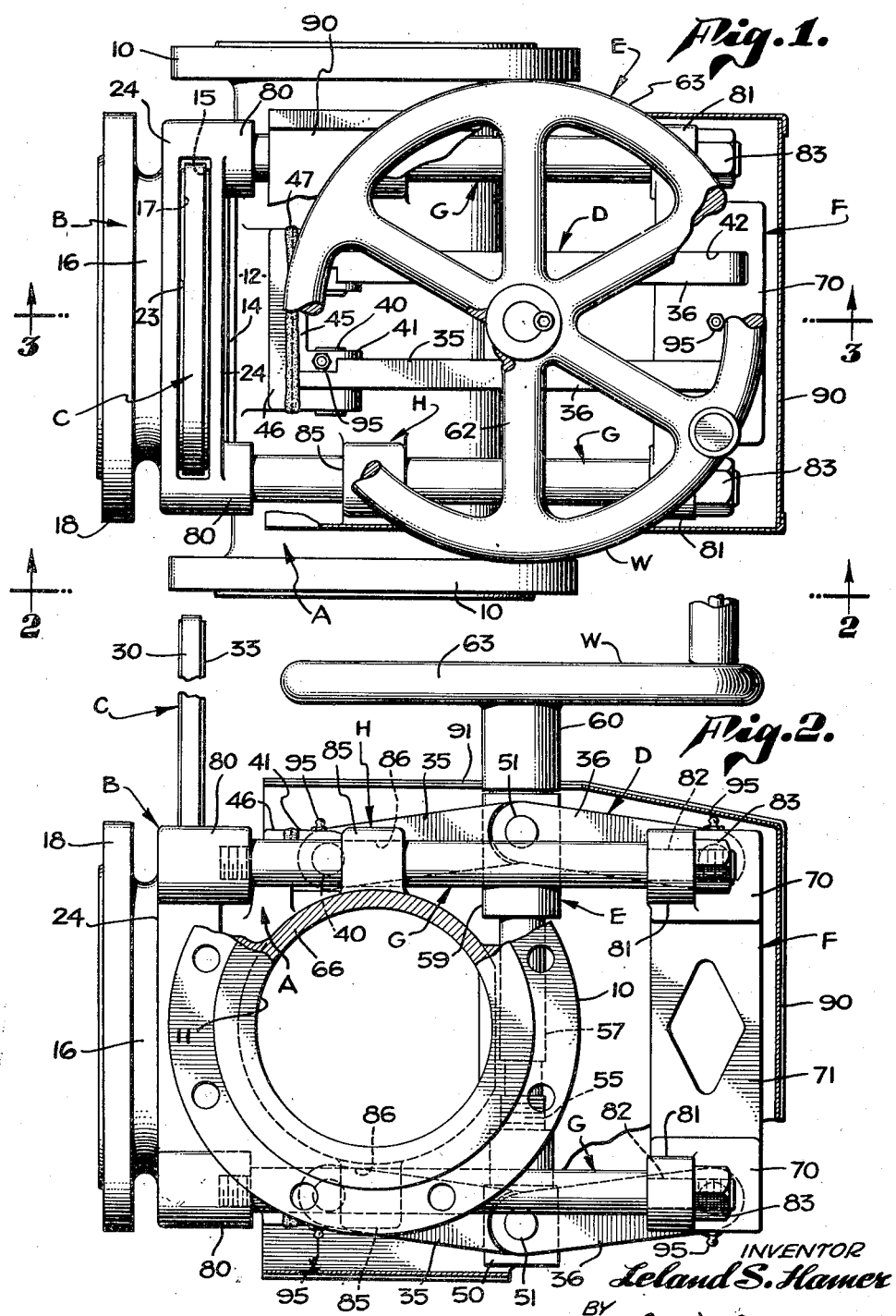

Aug. 18, 1953 — L. S. HAMER — 2,649,117
PIPE LINE FITTING
Filed Aug. 30, 1946 — 4 Sheets-Sheet 1

INVENTOR
Leland S. Hamer
BY
ATTORNEY

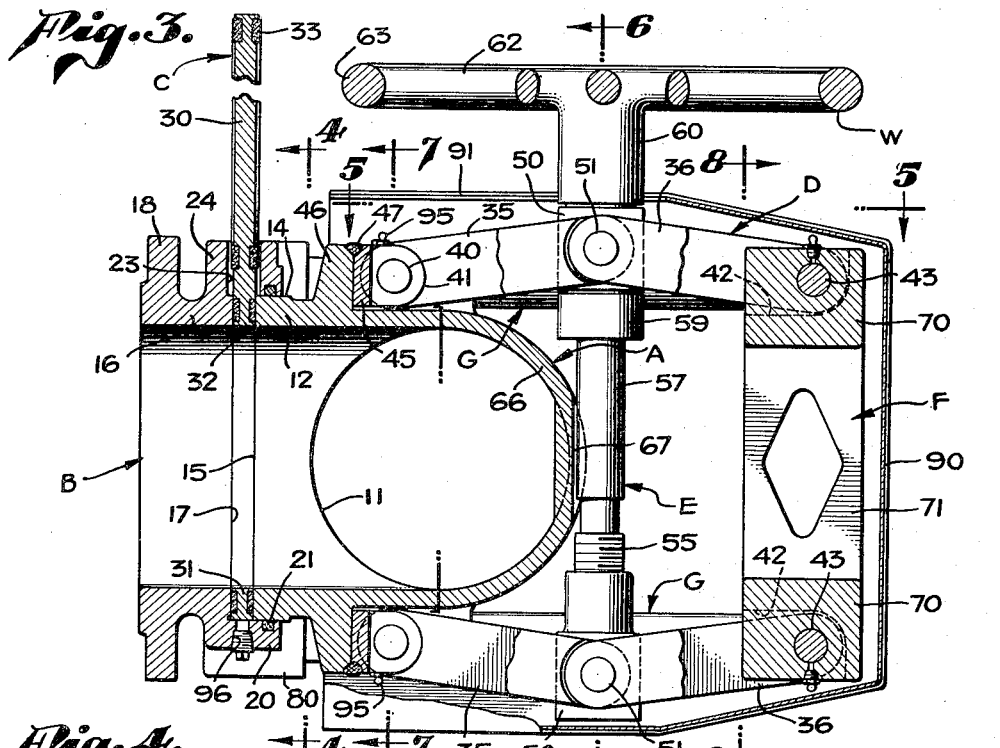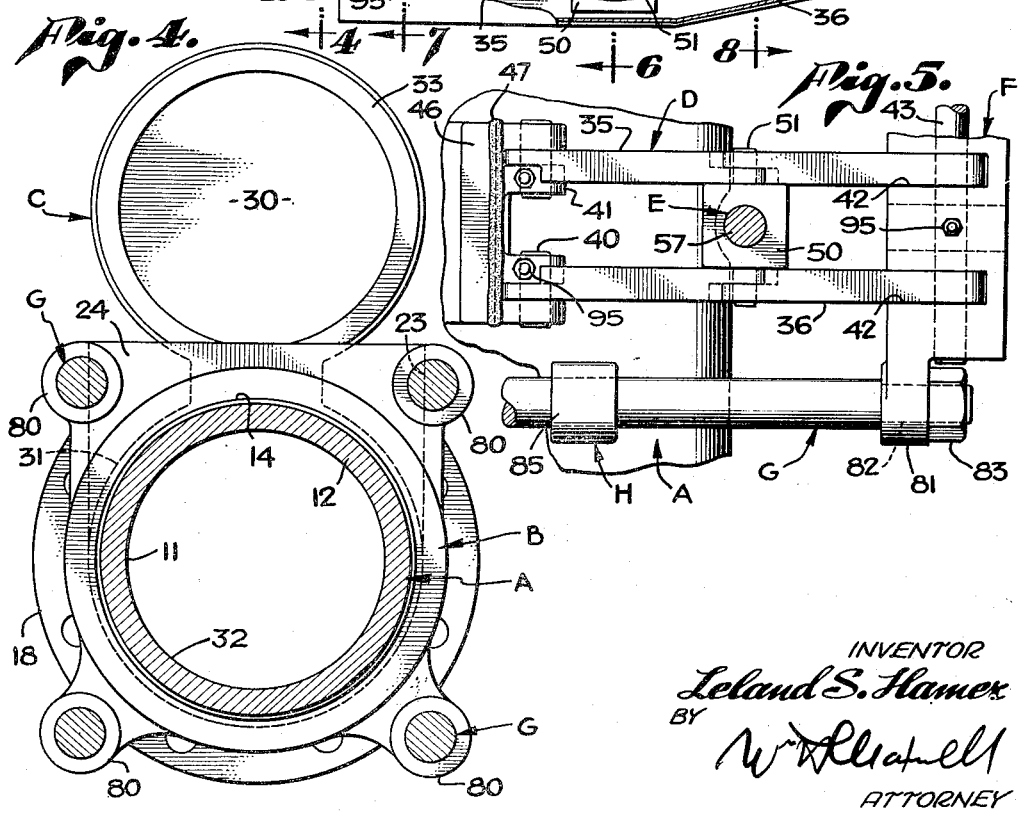

Aug. 18, 1953
L. S. HAMER
2,649,117
PIPE LINE FITTING
Filed Aug. 30, 1946
4 Sheets-Sheet 3
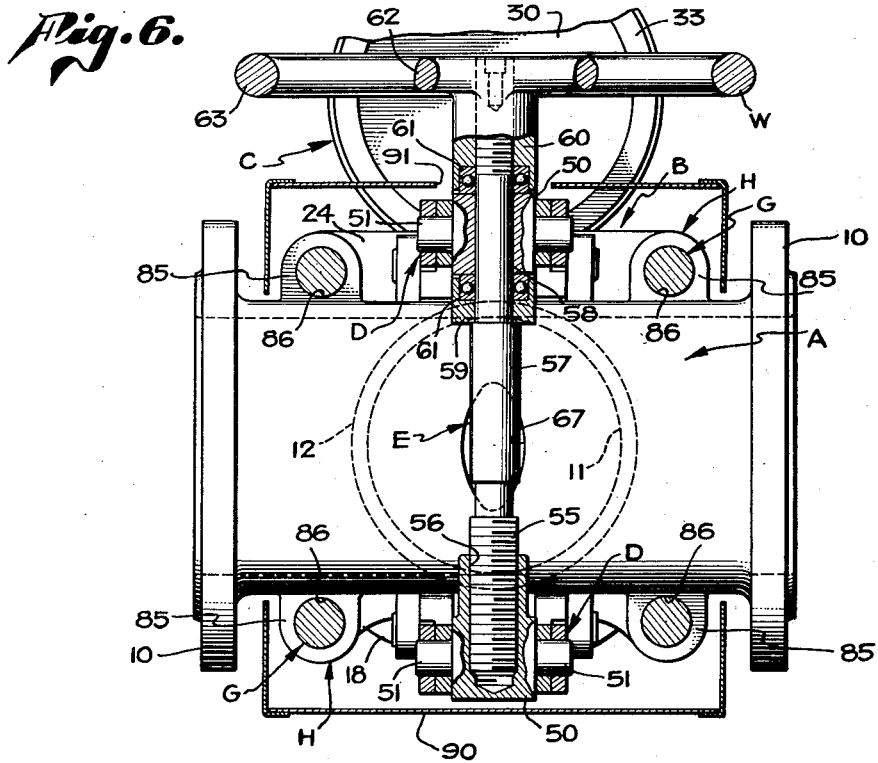
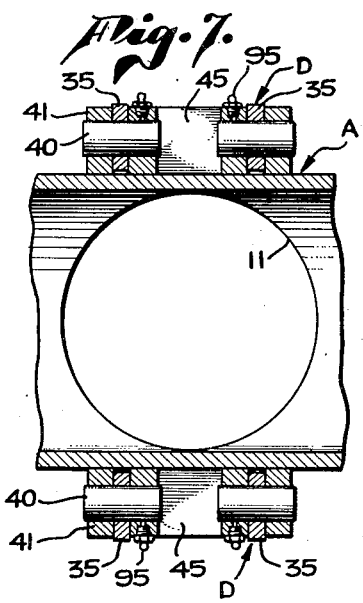
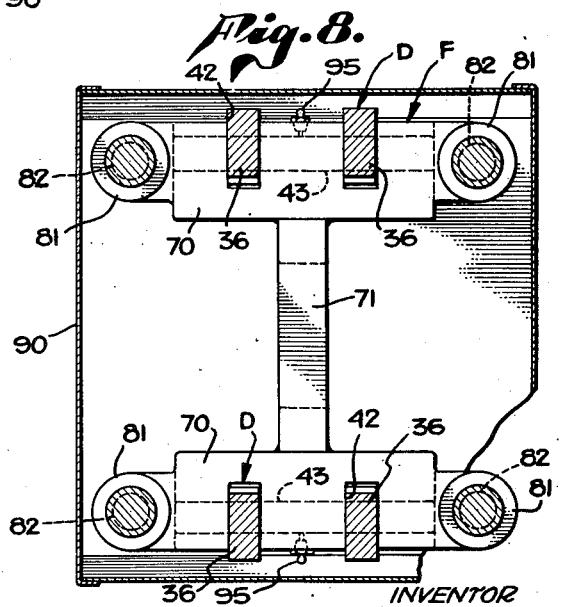
INVENTOR
Leland S. Hamer
BY
ATTORNEY

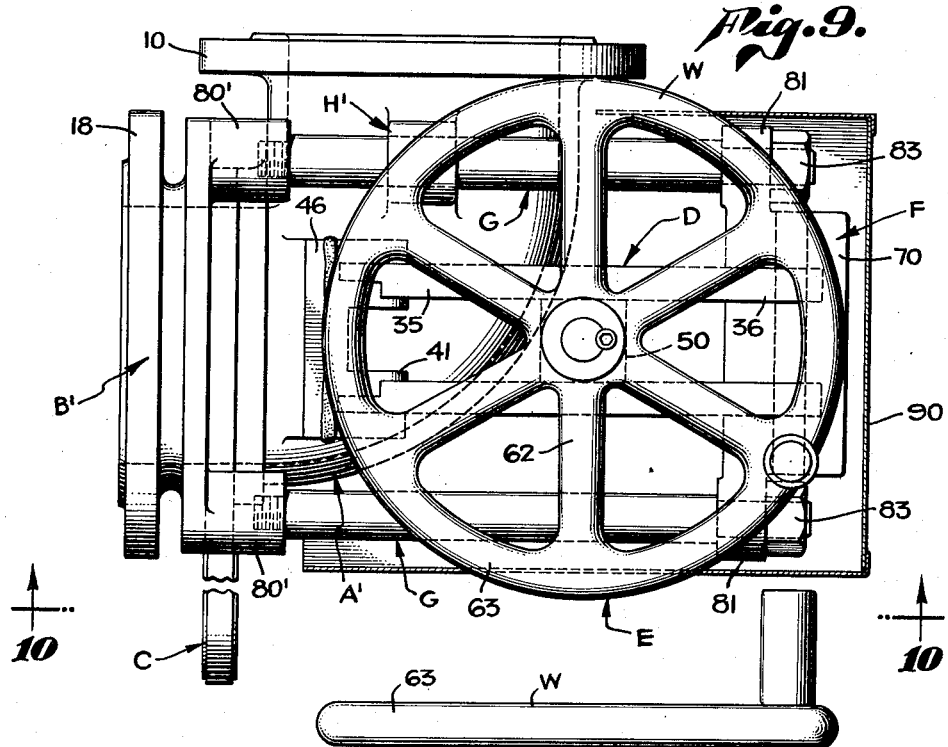
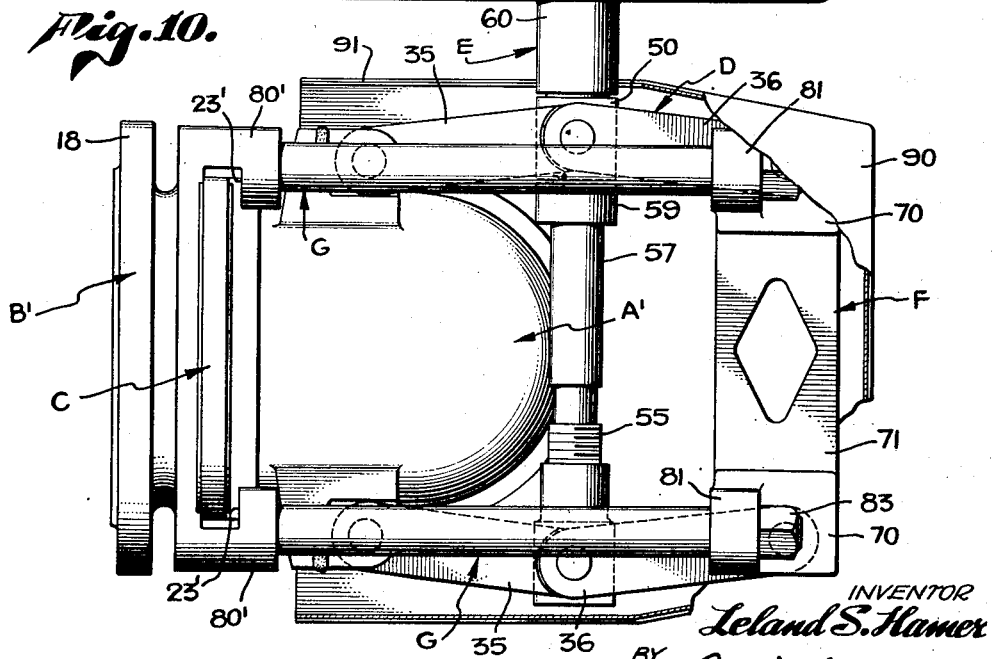

Patented Aug. 18, 1953

2,649,117

UNITED STATES PATENT OFFICE 2,649,117

PIPE LINE FITTING

Leland S. Hamer, Long Beach, Calif., assignor of one-fourth to Paul A. Dewhirst, Los Angeles, Calif.

Application August 30, 1946, Serial No. 694,020

22 Claims. (Cl. 138—94.3)

This invention has to do with a pipe line fitting and is more specifically concerned with that type of fitting wherein there are relatively movable parts cooperating with a plate such, for example, as a blinding plate or an orifice plate. It is a general object of the present invention to provide a fitting of the general character mentioned of improved form and construction and which is highly efficient in action and easy to operate.

It is an outstanding object of my present invention to provide a fitting of the general character hereinabove referred to which involves relatively movable parts cooperating with a blinding plate, or the like, and also operating means, all of which elements are so combined and related as to form a unitary structure insertable in a pipe line or manifold to take the place of a standard pipeline fitting such as a T or an L. There are numerous situations where line blinding devices are desirable but where the established constructions make it impossible or impractical to employ blinding devices such as are ordinarily available. For example, on ships and in refineries and in numerous like cases large and often heavy duty manifolds and piping systems are employed and to install anything but a standard fitting ordinarily involves a great deal of expense and is practically prohibitive. The fitting that I have provided is of such compact, simple form and arrangement that it is insertable in place of a standard or typical T-fitting or L-fitting and, consequently, it can be used in many situations where ordinary blinding devices cannot be.

It is a further object of the present invention to provide a fitting of the general character hereinabove referred to which can be operated easily and quickly. The mechanism that I have provided involves a toggle giving the operator great mechanical advantage over the parts to be moved and the parts are arranged and proportioned so that the toggle can be operated conveniently and quickly.

Another object of my invention is to provide a fitting of the general character referred to in which the relatively movable parts, that is, the body and collar between which the plate is clamped, are operated or controlled by a toggle mechanism which is effective both to spread the body and collar when desired, and to clamp or draw them together when it is desired to make or establish a tight clamping engagement with the plate.

A further object of the present invention is to provide a collar in a fitting of the general character referred to having a projecting flange surrounding the opening which passes the plate, which flange establishes a well that can be faced upwardly to prevent liquid from draining from the fitting when the plate is being removed or reversed.

It is a further general object of the present invention to provide a fitting of the character referred to in which the various essential parts are so nested or arranged together as to form a compact unit that can be advantageously housed in a simple, small, protective jacket or housing.

The various objects and features of my invention will be fully understood from the following detailed description of typical preferred forms and applications of my invention, throughout which description reference is made to the accompanying drawings, in which:

Fig. 1 illustrates the device of the present invention viewed from one direction to show what I will term the top of the structure, certain parts being broken away to show in section. Fig. 2 is a view taken as indicated by line 2—2 on Fig. 1, except that the housing is broken away to show in section. Fig. 3 is a central longitudinal detailed sectional view of the structure, being a view taken as indicated by line 3—3 on Fig. 1. Fig. 4 is a detailed transverse sectional view taken as indicated by line 4—4 on Fig. 3. Fig. 5 is a plan view taken substantially as indicated by line 5—5 on Fig. 3. Fig. 6 is a vertical transverse sectional view of the structure, being a view taken as indicated by line 6—6 on Fig. 3. Fig. 7 is a vertical transverse sectional view taken as indicated by line 7—7 on Fig. 3. Fig. 8 is a vertical transverse sectional view taken as indicated by line 8—8 on Fig. 3. Fig. 9 is a view similar to Fig. 1, showing another form of the invention, and Fig. 10 is a view taken as indicated by line 10—10 on Fig. 9.

The device of the present invention is referred to as a pipe line fitting in that it is useful generally in connection with pipes or like fluid handling equipment. However, it is to be understood that the device can be used to advantage in numerous and various situations and is not to be construed as limited strictly to use in connection with pipes, as such. In the drawings, for example, I have shown two forms of the invention, one illustrated in Figs. 1 to 8, inclusive, in which the device is in the general nature of a T-fitting or is useful in place of a standard type of T, whereas in Figs. 9 and 10 I have shown the device in the form of an L or such that it can be used in place of an ordinary or standard L-fitting. It is to be observed, however, that in both cases the device is shown provided with coupling means in the form of flanges such as to enable the device to be connected to pipes, headers, manifolds, or other like parts, as circumstances may require.

Referring to the form of the invention illustrated in Figs. 1 to 8, inclusive, the device involves, generally two relatively movable sections, one a body A, the other a collar B, the sections being cooperatively related to handle a plate C which may be either a blinding plate or an orifice or apertured plate, or a combination of the two, as shown in the drawings. The fitting further provides, generally, operating means for the shiftable or relatively movable sections and this operating means includes, generally, a toggle mechanism D and an actuator E for the toggle mechanism. In accordance with the preferred arrangement the inner link or links of the toggle mechanism D are coupled directly to the body A, while the outer links are coupled to a head F coupled to the collar B by rods G. The rods G are engaged by a suitable guide means H carried by the body A.

The body A in the form of the invention under consideration is generally in the form of a T-fitting, that is, it forms a fluid conducting passage open at what I will term the inner end of the fitting where the collar B is located and closed at the opposite or outer end beyond which the head F is located. Being a T-fitting the body has opposite side openings and in the case illustrated in the drawings it is provided with coupling flanges 10 at or surrounding the side openings. Being constructed in the manner just described the passage or flow handling opening 11 provided through the body A is T-shaped in form.

The inner end portion 12 of the body carries and cooperates with the collar B and in the preferred form of the invention it has its exterior turned and finished at 14 while its end face 15 is a flat finished face suitable for cooperation with the plate C.

The collar B is a clamp member or clamp collar at or on the inner end of the body A cooperating with the inner end portion 12 of the body A to hold and clamp the plate C. The main portion 16 of the collar is a tubular part with a passage through it corresponding in size with the passage through the body and having a finished end face 17 opposing the face 15 on the end of the body A. In the particular case illustrated the collar is shown provided with coupling means in the form of a coupling flange 18.

A sleeve extension 20 is provided on the collar B projecting beyond the finished face 17 and slidably engaged over the turned end portion 14 of the body A. Through the engagement of the sleeve 20 with the end portion of the body the collar B is effectively guided and held central relative to the inner end portion of the body. It is preferred that a sealing means such as a sealing ring 21 be provided between the sleeve and the end portion of the body to prevent leakage of fluid between these parts.

The sleeve projecting from the collar is provided at one side, preferably its upper side, with a slot-like opening 23 shaped and proportioned to pass the plate C into and out of position between the faces 15 and 17. The collar, with its projecting sleeve, is formed with upwardly projecting flange portions 24 surrounding the opening 23 and forming a well preventing fluid from spilling from the fitting when the plate C is not in place.

The plate C shown in the drawings is a typical control plate and has one end 30 which is imperforate and forms a blinding plate and has another end 31 with an aperture or passage 32 through it to register with and correspond in size to the passage through the collar and the passage through the body. The particular plate C illustrated is shown provided at each side and at each end with packing rings 33 to effect sealing engagement with faces 15 and 17 when the plate is between the faces and the collar B is operated toward the body A to cause clamping of the plate between the collar and the body.

The toggle mechanism that I have provided involves, generally, a plurality of pairs or sets of toggle links or arms, which act between or couple the body A and the head F. In accordance with my preferred arrangement I provide both upper and lower sets of toggle links, that is, I provide one or more sets of links at the lower portion of the fitting and one or more sets of links at the upper portion of the fitting, in which case the inner links 35 of each set overlie the body intermediate the side openings while the outer links 36 project from the outer end portion of the body or away from the body to connect to the head F, which is located outward of or beyond the outer end of the body. In the particular case illustrated I have shown two sets or two pairs of upper links and two pairs or two sets of lower links, the upper sets of links being spaced somewhat apart toward the sides of the body, and in like manner the lower sets of links are spaced somewhat apart toward the sides of the body.

The inner link 35 of each pair of links is pivotally connected directly to the body A by a pivot pin 40 carried by lugs 41 projecting from the body, there being a pair of lugs 41 receiving the end of each link 35. In the construction illustrated the lugs 41 are not formed or cast integrally with the body, but rather are carried on plates 45 made fast to a flange 46 projecting from the body as by welding 47, or the like. The outer ends of the outer links 36 extend into recesses 42 provided in the head F where they are held on pivot pins 43 carried by the head. In the arrangement illustrated one pivot pin carries the two outer links of the upper sets while another pivot pin carries the two outer links of the lower sets of links.

The adjoining ends of the inner and outer links of each set are pivotally connected together. In the arrangement illustrated coupling blocks 50 are arranged between the upper sets of links and the lower sets of links and each block has trunnions 51 projecting from its sides and pivotally connecting the links.

The actuator E that I have provided is preferably a screw member coupled or acting between the blocks 50 to which the links are connected by the trunnions on the blocks. In the particular construction illustrated the screw member is arranged to extend vertically and extends either above or below the body to a point convenient for an operating member or hand wheel W. In the case illustrated I have shown the screw member having its lower end portion 55 screw threaded into a socket 56 in the block 50 located between the lower sets of links and I have shown it provided with a shank 57 which extends upwardly through a bore 58 provided in the block between the upper sets of links. A shoulder member 59 is provided on the shank 57 immediately below the upper block and a hub or collar 60 on the wheel W forms a shoulder immediately above the upper block 50. Anti-friction bearings 61 are provided between the said shoulders and the upper and lower sides of the upper block 50 as clearly illustrated in Fig. 6 of the drawings.

The hand wheel W involves spokes 62 projecting from the hub 60 carrying a rim 63 and it is preferably made of a size and shape convenient for operation. Although I have shown the actuator arranged so that the wheel W is at the upper or top side of the fitting it will be obvious that the arrangement can be reversed so that it is at the lower side of the fitting. In extending between the blocks 50 the shank 57 of the actuator closely approaches the outer end wall 66 as at 67 to accommodate the shank 57, making it possible to confine the mechanism close to the body.

The head F which I locate beyond or outward of the outer end of the body A is a frame-like structure or element and in the case illustrated it involves upper and lower cross-arms 70 joined by a web or spreader 71. The arms 70 are formed with the recesses 42 which receive the links of the toggle mechanism, and they carry the pins 43 which hold the links in the recesses. The spreader 71 is merely a rigid connection maintaining the arms 70 in the desired spaced relationship as shown throughout the drawings.

The rods G couple the head F with the collar B. In accordance with the broader principles of my invention the rods may be varied considerably in number and arrangement. However, I prefer to employ four rods, two carried by the upper arm of the head and two carried by the lower arm of the head, and I prefer to space the rods so that they are about equidistant apart around the axis of the opening through the collar B and the inner end portion 12 of the body. The rods G are anchored or fixed to the collar B. For instance, as shown in the drawings they may be threaded into lugs 80 provided on the collar and they are anchored to the ends 81 of the arms 70 of head F. In the particular arrangement illustrated the rods have reduced end portions 82 that extend through the ends 81 of the arms and nuts 83 are threaded onto the reduced portions. Through this construction the head F is rigidly and firmly fixed to or carried by the outer ends of the rods G, the rods being rigidly fixed to the collar B. Through the rigid connection or frame structure just described the collar B is coupled to the head F to move therewith so that when the head F is moved through operation of the toggle mechanism D the collar B is correspondingly moved.

In practice I prefer to provide guide means H for the rods G to slidably support the frame structure just described. In the preferred arrangement I provide guide lugs 85 on the body and form the lugs 85 with guide openings 86 that slidably pass the rods G. By providing the guide means H, the guiding effect of the sleeve 20 on the inner end portion of the body A is supplemented so that the collar structure with the rods and head coupled to it works dependably and without danger of binding.

From the foregoing description it will be noted that the operation mechanism that I provide to effect relative movement between the body and collar is removed from the coupling flanges provided on the body and collar so that it in no way interferes with fastening the fitting to other parts such as pipes, headers, or the like. Furthermore, it will be observed from the drawings that the operating mechanism which is confined largely to what I have termed the outer end portion of the body A is compact so that it can be readily housed by a simple box-like housing 90. In the drawings I have shown the housing as a sheet metal structure made just sufficiently large to accommodate the working parts and I have shown the top of the housing provided with a slot or passage 91 to accommodate the actuator so that the housing can be slid into and out of position, at will. It is to be understood, of course, that the housing can be constructed in any suitable manner and can be mounted or secured, as desired. In general it is desirable to provide a housing which protects the working parts against corrosion or foreign matter, although the mechanism that I have provided is simple and rugged so that it can, if desired, be employed without any protective housing. It is to be observed from the drawings that I have provided the fitting with various features of construction such as lubricating fittings 95 by which lubricant can be supplied to the various working parts, and the collar B is provided with a plugged drain opening 96 so that the well into which the plate C fits can be drained, if desired.

It is to be observed that I have arranged and related the parts, particularly the actuator E and the toggle mechanism D relative to the head F and collar B so that when the collar B is moved toward the body A and clamps the plate C to the body, the links of the toggle mechanism closely approach parallelism, with the result that I gain a substantial mechanical advantage between the screw actuator and the collar B through the toggle mechanism. In practice the toggle mechanism is effective not only as a means for drawing the collar B toward the body A to effect clamping of the plate C between the collar and the body, but is also effective and highly desirable as a means for spreading the collar B away from the body A when it is desired to remove the plate C. This is particularly important in large fittings or where the equipment is designed for heavy duty, for in such cases the structure in which the fitting is incorporated may be so connected up as to be rigid and extremely difficult, if not almost impossible to move, except by the application of great force. Through the toggle mechanism actuated by the screw I am able to apply great force both in moving the collar B toward the body A and in spreading it away from the body A and thus I have provided a fitting that is highly advantageous in practice.

In the form of the invention illustrated in Figs. 9 and 10 of the drawings the body A' has an inner end portion carrying a collar B' corresponding generally to the collar hereinabove described. The collar B' that I have shown in this form of the invention has lugs 80' corresponding to the lugs 80 above described, and the lower set of lugs 80' is provided with openings 23' which permit passage of the plate C.

In this form of the invention, however, the body A' has but one side opening and consequently is in the form of an L-fitting rather than a T, as above described. The various other parts of the fitting may be substantially the same as I have described above, that is, the head F may be coupled to the collar B' by rods G and the toggle mechanism D is operable by the actuator E to move the head F. It is to be observed, however, that I have shown guide means H' supporting the upper rods only, the lower rods being entirely free between the collar B' and the head F. It is also to be observed that in this modified form of the invention the collar B' is applied or may be applied to the body A so that the plate C is movable into and out of position between the collar and body from the side of the fitting opposite that provided with the side opening rather than from the top or bottom, as hereinabove described. In this connection it is to be noted that when I have referred to parts such as top, bottom, sides and ends I have done so primarily to facilitate description and an understanding of the structure, and I do not wish it understood that the structure needs to be used in any particular manner or with the parts arranged in any particular manner, since it is obvious that it can be arranged and used in any position that may be desired, excepting, of course, that if the well construction provided in the collar B is to be utilized it should be arranged to face upwardly.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A flow handling fitting of the character described including, two relatively movable tubular slidably related flow handling sections, a flow controlling plate arranged between the sections to be clamped therebetween, means operating the sections relative to each other and into clamping engagement with the plate including, a toggle mechanism having two like spaced link mechanisms connecting said sections, each link mechanism having two links with adjoining ends and a block to which the adjoining ends of the links are pivotally connected, and a rotatable operating member extending between the blocks of the link mechanisms and threaded to the block of one link mechanism and rotatably engaging the block of the other link mechanism to operate the blocks relative to each other when the member is rotated.

2. A flow handling fitting of the character described including, two relatively movable tubular slidably related flow handling sections, a flow controlling plate arranged between the sections to be clamped therebetween, means operating the sections relative to each other and into clamping engagement with the plate including, a toggle mechanism having like link mechanisms connecting said sections, one of said link mechanisms being on either side of one of the sections, each link mechanism having two links with adjoining ends and a block to which the adjoining ends of the links are pivotally connected, and a rotatable operating member having a threaded portion engaging the block of one link mechanism, a shank rotatably engaging the block of the other link mechanism, and an operating handle on said member to facilitate turning it.

3. A flow handling fitting of the character described including a flow controlling plate, two relatively movable tubular plate receiving flow handling sections one a body section with inner and outer end portions and the other a clamp section having a collar surrounding and slidably carried on the inner end portion of the body section, the clamp section having a head coupled to the collar to move therewith relative to the body section and located beyond the outer end of the body, toggle links pivotally connected together and to the body and to the head, and a screw located between the said outer end of the body section and the head of the clamp section and operating the links.

4. A flow handling fitting of the character described including, a flow controlling plate, two relatively movable tubular flow handling sections one a body section with inner and outer end portions and the other a clamp section having a collar slidably carried on the inner end portion of the body and having a head coupled to the collar to move therewith relative to the body section and located opposite and beyond the outer end portion of the body, a plurality of sets of toggle links each including an inner link pivotally connected to the body and an outer link pivotally connected to the head, and a single screw member extending between and operating the sets of links.

5. A flow handling fitting of the character described including, a flow controlling plate, two relatively movable tubular flow handling sections, one a body section with inner and outer end portions and the other a clamp section having a plate engaging face opposing the inner end portion of the body and having a head located beyond the outer end of the body, a plurality of sets of toggle links each including an inner link pivotally connected to the body and an outer link pivotally connected to the head, and a single screw arranged between the head and body and operating the sets of links.

6. A flow handling fitting of the character described including, a flow controlling plate, two relatively movable flow carrying sections, one a body section with inner and outer end portions and the other a clamp section having a collar slidably carried on the inner end portion of the body, having a plate engaging face opposing the inner end portion, and having a head located opposite and beyond the outer end of the body, two sets of toggle links each including an inner link pivotally connected to the body and an outer link pivotally connected to the head, and a single screw arranged between the head and body and extending transversely of the body and rotatably connected to one of the sets of links and having threaded connection with the other set of links.

7. A flow handling fitting of the character described including, a flow controlling plate, two relatively movable flow carrying sections one a body section with inner and outer end portions and the other a clamp section having a plate clamping face opposing the inner end portion of the body and having a head located beyond the outer end of the body, two spaced sets of toggle links each set including two pairs of links and each pair including an inner link pivotally connected to the body and an outer link pivotally connected to the head, blocks between the pairs of links of each set and pivotally connecting the inner and outer links of each pair, and a single screw member cooperating with the blocks to move them relative to each other and operate the links, one block being rotatably coupled with the screw member to move axially therewith and the other block having threaded engagement with the screw member.

8. A flow handling fitting of the character described including, a flow controlling plate, two relatively movable tubular sections one a body section with inner and outer end portions and the other a clamp section having a collar slidably carried on the inner end portion of the body with a plate clamping face opposing the inner end portion and having a head coupled to the collar and located beyond the outer end of the body, two spaced sets of toggle links each set including two pairs of links and each pair including an inner link pivotally connected to the body and an outer link pivotally connected to the head, blocks between the pairs of links of each set and having trunnions pivotally connecting the inner and outer links of each pair, and a single screw member cooperating with the blocks to move them relative to each other and operate the links, the screw member being threaded to one block and rotatably coupled to the other block.

9. A flow handling fitting of the character described including, a flow controlling plate, two relatively movable tubular sections one a body section with inner and outer end portions and the other a clamp section having a collar carried by the inner end portion of the body with a plate clamping face opposing the inner end portion and having a head located beyond the outer end of the body, two spaced sets of toggle links each set including two pairs of links and each pair including an inner link pivotally connected to the body and an outer link pivotally connected to the head, blocks between the pairs of links of each set and pivotally connecting the inner and outer links of each pair, and an elongate member threaded to one block and rotatably coupled with the other block whereby said other block is held against movement lengthwise of said member.

10. A flow handling fitting of the character described including, a flow controlling plate, two relatively movable tubular flow conducting sections one a body section with inner and outer end portions and the other a clamp section having a collar slidably mounted on the inner end portion of the body with a plate clamping face opposing the end of the body, a head located beyond the outer end of the body, and a plurality of rods spaced apart around the fitting and rigidly coupling the collar and head, toggle links connected together and to the body and to the head, and a screw located between the body and head and operating the links.

11. A flow handling fitting of the character described including, a flow controlling plate, two relatively movable tubular flow handling sections one a body section with inner and outer end portions and the other a clamp section having a collar surrounding and slidably carried on the inner end portion of the body and having a head located opposite and beyond the outer end of the body section, inner and outer toggle links pivotally connected together, the inner links being connected to the body section and the outer links being connected to the head, and a screw located between the said outer end of the body section and head and operating the links, the head being rigidly coupled with the collar and including spaced arms carrying the outer links and a spreader extending between the arms and holding the arms rigidly spaced apart.

12. A flow handling fitting of the character described including, a flow control plate, a tubular flow conducting body section with a portion having a plate receiving end face, a tubular flow conducting clamp section, spaced parallel rods with middle portions slidably supported by the body section parallel with said portion thereof, with anchored ends secured to the clamp section and with terminal ends spaced from the body section, the clamp section having an annular plate clamping face opposing the said end face of the body, and operating means including, toggle mechanisms coupled with the rods to operate them relative to the body and means adapted to operate the toggle mechanisms, each toggle mechanism including pivotally connected inner and outer links, the inner links of such mechanisms being connected to the body section and the outer links of said mechanisms being connected with the terminal ends of the rods.

13. A flow handling fitting of the character described including, a flow control plate, a flow conducting body section with a tubular portion having a plate receiving end face, a clamp section, spaced parallel rods with middle portions slidably supported by the body section at the exterior thereof, with anchored ends carried by the clamp sections and with terminal ends spaced from the body section, the clamp section being a tubular part carried by the rods and slidably supported on said portion of the body section and having an annular plate clamping face opposing the said end face of the body, and operating means including toggle links connected between the body section and the terminal ends of the rods to operate the clamp section relative to the body section and means adapted to operate the links.

14. A flow handling fitting of the character described including, a flow control plate, a flow conducting body section with an elongate tubular portion having a plate receiving end face, a flow conducting clamp section with a tubular clamp portion having an annular plate engaging face opposing the said face of the body section, having a head spaced from the body section, and having rods rigidly connecting the head and said clamp portion, and operating means shifting the clamp section relative to the body section to clamp the sections to the plate and including toggle links and a screw operating the links.

15. A flow handling fitting of the character described including, a flow control plate, a flow conducting body section with a tubular portion having a plate receiving end face, a flow conducting clamp section with a tubular clamp portion having an annular plate engaging face opposing the said face of the body section, having a head spaced from the clamp portion, and having rods connecting the head and said clamp portion, the rods having middle portions slidably engaged with the body section and operating links spaced from the body section connecting the body section and the head and adapted to shift the clamp section relative to the body section to clamp the sections to the plate and a screw located between the head and body section and adapted to operate the links.

16. A flow handling fitting of the character described including, a flow control plate, a flow conducting body section with an elongate tubular portion having a plate receiving end face, a flow conducting clamp section with a tubular clamp portion having an annular plate engaging face opposing the said face of the body section, having a head spaced from the body section, and having rods connecting the head and said clamp portion, and operating means shifting the clamp section relative to the the body section to clamp the sections to the plate and including toggle links and a screw operating the links, the body section having side lugs slidably supporting the rods.

17. A flow handling fitting of the character described including, a flow control plate, a body section with an elongate tubular flow conducting portion having a plate receiving end face, a clamp section with a tubular flow conducting clamp portion slidably engaging said portion of the body section and having a plate engaging face opposing the said face of the body section, having a head spaced from the body section, and having spaced rods at the exterior of the body section connecting the head and said clamp portion, and operating means shifting the clamp section relative to the body section to clamp the sections to the plate and including toggle links and a screw operating the links, the body section having a side opening located between the rods.

18. A flow handling fitting of the character described including, a flow control plate, a body section with an elongate tubular flow conducting portion having a plate receiving end face, a clamp section with a tubular flow conducting clamp portion slidably engaging said portion of the body section and having a plate engaging face opposing the said face of the body section, having a head spaced from the body section, and having spaced rods at the exterior of the body section connecting the head and said clamp portion, and operating means shifting the clamp section relative to the body section to clamp the sections to the plate and including toggle links and a screw operating the links, the body section having a side opening located between the rods and having side lugs slidably supporting the rods.

19. A flow handling fitting of the character described including, a flow conducting body section with an open inner end portion having an end face, a closed outer end portion and opposite side openings at the outer end portion, a flow conducting clamp section having a collar portion slidable on the inner end portion of the body section and having an annular face opposing the face of the body section, a head opposite and spaced from the outer end portion of the body section, and spaced rods at the exterior of the body section connecting the head and collar portion, a plate between and engaged by said faces, and operating means shifting the sections relative to each other including toggle links between the body section and head and means operating the links.

20. A flow handling fitting of the character described including, a flow conducting body section with an open inner end portion having an end face, a closed outer end portion and opposite side openings at the outer end portion, a flow conducting clamp section having a collar portion slidable on the inner end portion of the body section and having a face opposing the face of the body section, a head spaced from the outer end portion of the body section, and spaced rods at the exterior of the body section and located at opposite sides thereof and rigidly connecting the head and collar portion, lugs on the exterior of the body section slidably supporting the rods, a plate between and engaged by said faces, and operating means shifting the sections relative to each other including toggle links between the body section and head and a screw operating the links.

21. A flow handling fitting of the character described including; two relatively movable tubular flow handling sections, one a body section with an end portion with a clamp face and the other a clamp section with a head and with a part having a clamp face, said part slidably receiving said end portion of the body section, a flow controlling plate arranged between and adapted to be clamped by the clamp faces of said sections; and a toggle mechanism including links pivotally connected together, one of said links being pivotally connected to the body section and the other of said links being pivotally connected to the head of the clamp section, and a screw adapted to operate said links to move the sections relative to each other to clamp the plate between the said clamp faces.

22. A flow handling fitting of the character described including, a tubular flow control plate, a tubular flow conducting body section with an end portion having an annular plate receiving end face, a flow conducting clamp section, spaced parallel rods carried by the clamp section and slidably engaged with the body section at the exterior thereof at points intermediate the ends of said rods, said clamp section having an annular plate clamping face opposing said face of the body, and operating means including toggle links coupled with the rods at points spaced from the points where the rods engage the body section and on the opposite side thereof from said clamp section and adapted to operate the rods relative to the body section and means adapted to operate the links.

LELAND S. HAMER.

References Cited in the file of this patent

UNITED STATES PATENTS

| Number | Name | Date |
|---|---|---|
| 161,751 | Butterworth | Apr. 6, 1875 |
| 1,165,946 | De Long | Dec. 28, 1915 |
| 1,547,172 | Knauf | July 28, 1925 |
| 1,599,168 | Duncan | Sept. 7, 1926 |
| 1,762,818 | Hoffman | June 10, 1930 |
| 1,890,061 | Lefkowitz | Dec. 6, 1932 |
| 1,915,744 | McGee | June 27, 1933 |
| 1,985,234 | Beardsley | Dec. 25, 1934 |
| 2,074,091 | MacKinnon | Mar. 16, 1937 |
| 2,299,124 | Boynton | Oct. 20, 1942 |
| 2,340,499 | Zachow | Feb. 1, 1944 |
| 2,344,594 | Bryant | Mar. 21, 1944 |
| 2,370,604 | De Craene | Feb. 27, 1945 |